(12) United States Patent
Kalyanasundaram et al.

(10) Patent No.: US 8,855,253 B2
(45) Date of Patent: Oct. 7, 2014

(54) ERROR PREDICTION FOR TWO-STAGE RECEIVERS

(75) Inventors: Suresh Kalyanasundaram, Bangalore (IN); Shirish Nagaraj, Hoffman Estates, IL (US); Raghavendra M. Ramakrishna, Bangalore (IN)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/488,965

(22) Filed: Jun. 5, 2012

(65) Prior Publication Data
US 2013/0223501 A1 Aug. 29, 2013

(30) Foreign Application Priority Data
Feb. 24, 2012 (IN) .............................. 534/DEL/2012

(51) Int. Cl.
| H03D 1/04 | (2006.01) |
|---|---|
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl.
USPC ........................................................ 375/346

(58) Field of Classification Search
USPC ................. 375/346; 455/452.2; 370/335, 349
See application file for complete search history.

(56) References Cited

U.S. PATENT DOCUMENTS

| 6,314,147 | B1 | 11/2001 | Liang et al. .................. 375/346 |
| 6,721,373 | B1 * | 4/2004 | Frenkel et al. ................ 375/346 |
| 2003/0112776 | A1 * | 6/2003 | Brown et al. ................. 370/335 |
| 2005/0147023 | A1 | 7/2005 | Stephens et al. ............. 370/203 |
| 2009/0274139 | A1 * | 11/2009 | Palanki ........................ 370/349 |
| 2010/0064185 | A1 | 3/2010 | Zheng et al. ................. 714/704 |
| 2010/0304751 | A1 | 12/2010 | Ji et al. ......................... 455/450 |
| 2010/0323713 | A1 * | 12/2010 | Liu ............................ 455/452.2 |

FOREIGN PATENT DOCUMENTS

| WO | WO-2011/139191 A1 | 11/2001 |
| WO | WO-2007/046894 A1 | 4/2007 |

OTHER PUBLICATIONS

Eyal Zohar et al "The Power of Prediction: Cloud Bandwidth and Cost Reduction"; SIGCOMM, ACM, Aug. 15, 2011, XP058006642, DOI: 10.1145/2018436.2018447; ISBN 9781450307970; New York (12 pages).
"Coordinated Multipoint: Concepts, Performance, and Field Trial Results", Ralf Irmer et al., IEEE Communications Magazine, Feb. 2011, pp. 102-111.
"Uplink Coordinated Multi-Point Reception for LTE-Advanced Systems", Dajie Jiang et al., IEEE, 2009, 4 pgs.
"Performance of the LTE Uplink with Intra-Site Joint Detection and Joint Link Adaptation", Andreas Muller et al., IEEE, 2010, 5 pgs.

* cited by examiner

Primary Examiner — Chieh M Fan
Assistant Examiner — Wednel Cadeau
(74) Attorney, Agent, or Firm — Harrington & Smith

(57) ABSTRACT

Apparatus, methods, and programs products are disclosed that perform the following techniques: in a receiver comprising first and second stages, each stage at least decoding information corresponding to a user equipment, wherein the second stage performs decoding only if the first stage completes decoding with a fail, predicting whether decoding performed by the second stage for the user equipment will complete with a pass or fail; and prior to completion of the second stage, sending an indication of the predicted pass or fail to the user equipment.

20 Claims, 12 Drawing Sheets

US 8,855,253 B2

ERROR PREDICTION FOR TWO-STAGE RECEIVERS

CROSS-REFERENCE TO RELATED ED APPLICATIONS

This application claims the benefit under 35 U.S.C. §119 of Indian Patent Application No. 534/DEL/2012, filed on Feb. 24, 2012 in India, and entitled "Error Prediction for Two-Stage Receivers", the disclosure of which is hereby incorporated by reference in its entirety.

TECHNICAL FIELD

This invention relates generally to wireless networks and, more specifically, relates to error reporting used in the wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

| | |
|---|---|
| ACK | acknowledgement (e.g., positive acknowledgement) |
| CoMP | coordinated multi-point |
| CRC | cyclic redundancy check |
| DL | downlink (from the base station to the UE) |
| eNode B (eNB) | evolved Node B (LTE base station) |
| E-UTRAN | evolved UTRAN |
| FFT | fast Fourier transform |
| GW | gateway |
| HARQ | hybrid automatic repeat request |
| IC | interference cancellation |
| LMMSE | linear minimum mean squared error (MMSE) |
| LTE | long term evolution |
| MIMO | multiple-input, multiple-output |
| MMSE | minimum mean squared error |
| MU-MIMO | multi-user MIMO |
| NACK | negative acknowledgement |
| NCE | network control element |
| NDI | new data indicator |
| PDCCH | physical downlink control channel |
| PDSCH | physical downlink shared channel |
| SINR | signal to interference plus noise ratio |
| TTI | transmission time interval |
| UE | user equipment |
| UL | uplink (from UE to base station) |
| UMTS | universal mobile telecommunications system |
| UTRAN | universal terrestrial radio access network |

Non-linear receivers are known to improve the spectral efficiency in UL multiuser-MIMO (MU-MIMO) and UL coordinated multipoint systems (CoMP). A good example for CoMP is a large stadium with a number of eNBs coordinated between each other to support a need for higher data rates during a sporting event.

The non-linear receivers achieve significant capacity improvements and comprise two stages. The first stage is a front-end linear receiver and this stage is followed by a second stage receiver that performs interference reconstruction, interference cancellation and linear reception.

In non-linear receivers, interference reconstruction is achieved after receiving hard or soft bits from other eNB receivers. That is, the eNB receivers exchange hard or soft bits with other eNB receivers and use hard or soft bits in, e.g., the interference reconstruction and cancellation.

Non-linear receivers suffer from latency issues and therefore delay HARQ signaling to the UEs. For instance, the receiver processing cannot be completed within a TTI with a nonlinear receiver. The eNB is required to complete the two stage receiver processing in one TTI and report ACK or NACK information to a UE. However, the second stage is required to wait for exchange of decoded packets, interferer reconstruction, interference cancellation and other receiver processing and hence adds to latency.

Signaling HARQ information to the UE based only on the first stage of a non-linear receiver may result in inefficient use of the UL resource. As an example, assume that the first stage result is a decode failure and hence a NACK is sent to the UE. However, completion of the second stage of the receiver (e.g., interference cancellation receiver) results in a decode success and hence the resource for retransmissions from the UE is wasted, thereby leading to inefficient use of the UL resource.

SUMMARY

This section contains examples of possible implementations and is not meant to be limiting.

In an exemplary embodiment, a method includes the following: in a receiver including first and second stages, each stage at least decoding information corresponding to a user equipment, wherein the second stage performs decoding only if the first stage completes decoding with a fail, predicting whether decoding performed by the second stage for the user equipment will complete with a pass or fail; and prior to completion of the second stage, sending an indication of the predicted pass or fail to the user equipment.

In another example, an apparatus includes one or more processors, and one or more memories including computer program code. The one or more memories and the computer program code are configured to, with the one or more processors, cause the apparatus to perform at least the following: in a receiver comprising first and second stages, each stage at least decoding information corresponding to a user equipment, wherein the second stage performs decoding only if the first stage completes decoding with a fail, predicting whether decoding performed by the second stage for the user equipment will complete with a pass or fail; and prior to completion of the second stage, sending an indication of the predicted pass or fail to the user equipment.

In a further example, a computer program product is disclosed that comprises a computer-readable memory medium bearing computer program code embodied therein for use with a computer. The computer program code comprises: code for, in a receiver comprising first and second stages, each stage at least decoding information corresponding to a user equipment, wherein the second stage performs decoding only if the first stage completes decoding with a fail, predicting whether decoding performed by the second stage for the user equipment will complete with a pass or fail; and code for prior to completion of the second stage, sending an indication of the predicted pass or fail to the user equipment.

In an additional exemplary embodiment, an apparatus comprises means for receiving comprising first and second stages, each stage at least decoding information corresponding to a user equipment, wherein the second stage performs decoding only if the first stage completes decoding with a fail. The apparatus additionally comprises means for predicting whether decoding performed by the second stage for the user equipment will complete with a pass or fail; and means for sending, prior to completion of the second stage, an indication of the predicted pass or fail to the user equipment.

BRIEF DESCRIPTION OF THE DRAWINGS

In the attached Drawing Figures:

FIG. 4, including

FIGS. 11A and 11B, shows examples of performing an SINR calculation and predicting a HARQ ACK/NACK.

DETAILED DESCRIPTION OF THE DRAWINGS

In order to avoid the above-described inefficient use of the UL resource, it is proposed herein to predict the ACK/NACK status at the end of the second stage receiver. The HARQ prediction can be based on one or more of the following non-limiting metrics: (1) SINR estimate after interference cancellation; (2) post-equalized SINR after interference cancellation; (3) mutual information measured at the end of first stage of decoding. Dedicated computing resources are used for the second stage receiver computations while the primary resources are used for the first stage receiver and HARQ prediction. That is, the assumption is that the hardware may have enough MIPS (millions of instructions per second) only to decode one round of all users—this would be the primary hardware resources. In this case, the hardware can be augmented with extra processing power (e.g., dedicated or secondary hardware resources) that can perform a second round of decoding for the users where the initial decode did not succeed the first time. This is also the reason why it is beneficial to predict the HARQ in the first place—the current receiver would need all the latency to do one round of decode by the time the receiver has to signal the HARQ status to the UE. With the predictive HARQ approach, the receiver can have extra time such that the secondary hardware resources try another round of decoding.

If ACK prediction is incorrect (e.g., ACK was predicted but a NACK actually occurred after the second stage processing), then the existing LTE PDCCH signaling still enables a retransmission from the UE, as this signaling is in the form of the NDI toggle in the PDCCH. Simulation results show about a 90 percent accuracy for exemplary ACK/NACK prediction.

The invention is applicable, e.g., for receivers with (hard or soft) interference cancellation (IC). In terms of MU-MIMO, the decoded users are subtracted from the received signal for the second stage user detection. In terms of CoMP, the eNBs are coordinated to exchange the decoded packets for interference cancellation.

An IC-based, non-linear receiver has two stages: the first stage operates on received signal and if the decode fails, the second stage receiver operates on an interference cancelled signal. The eNB is required to complete the two stage receiver processing in one TTI and report ACK or NACK information to UE. The second stage is required to wait for, e.g., exchange of decoded packets, interferer reconstruction, interference cancellation and additional receiver operations based thereon, and hence adds to latency.

Figure 1:
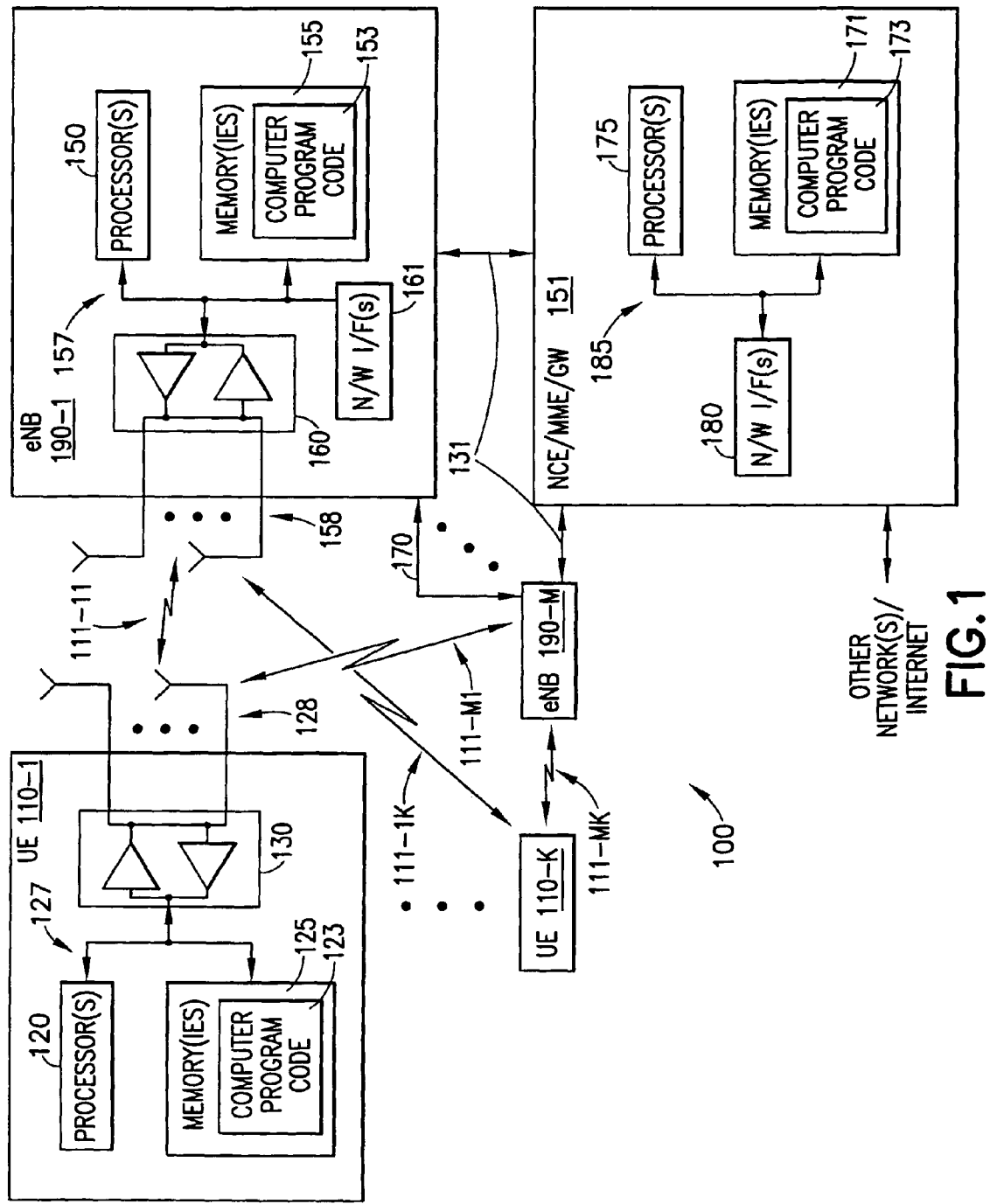
FIG. 1 illustrates a block diagram of an exemplary system in which the instant invention may be used.

Reference is made to FIG. 1, which shows a block diagram of an exemplary system in which the exemplary embodiments may be practiced. In FIG. 1, K UEs 110-1 through 110-K are in wireless communication with a network 100 via one or more corresponding links 111. For instance, UE 110-1 communicates with eNB 190-1 via link 111-11 and communicates with eNB 190-M via link 111-M1, where the first digit in the two digits (e.g., of "11" or "M1") refers to the eNB 190 and the second digit refers to the UE 110. UE 110-K communicates with eNB 190-1 via link 111-1K and communicates with eNB 190-M via link 111-MK. The "communication" here should be construed broadly, since UE 110-1 might be attached to eNB 190-1, and eNB 190-M could be a "bystander" in the communication between the UE 110-1 and the eNB 190-1. That is, a transmission from the UE 110-1 is intended only for the eNB 190-1, but the transmission is also received at the eNB 190-M. Conversely, the UE 110-1 could be in "active" communication with both eNBs 190-1 and 190-M, such as may occur in certain CoMP scenarios.

A single UE 110-1 is described in more detail in reference to FIG. 1, and it is assumed that other UEs 110 are similar. The user equipment 110-1 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110-1 to perform one or more of the operations as described herein.

A single eNB 190-1 is described in more detail in reference to FIG. 1, and it is assumed that other eNBs 190 are similar. The eNB 190-1 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNB 190 to perform one or more of the operations as described herein. The one or more network interfaces 161 communicate using, e.g., the links 170 and 131. Two or more eNBs 190 communicate using, e.g., link 170. The links 170 may be wired or wireless or both and may implement, e.g., an X2 interface.

The network 100 may include a network control element (NCE) 151 that may include MME/SGW (mobility management entity/serving gateway) functionality, and which provides connectivity with a further network, such as a telephone network and/or a data communications network (e.g., the Internet). The eNBs 190 are coupled via the links 131 to the NCE 151. The links 131 may be implemented using, e.g., an S1 interface. The NCE 151 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 151 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Before proceeding with a description of exemplary interference canceling receivers, it is helpful to provide a mathematic basis for the receivers. For simplicity, consider a two user case where the signal model for a subcarrier is the following:

$$y = h_1 x_1 + h_2 x_2 + n$$

$$y = \underbrace{[h_1 \; h_2]}_{H} \underbrace{\begin{bmatrix} x_1 \\ x_2 \end{bmatrix}}_{x} + n$$

$$y = Hx + n$$

where y is a received vector, x is a matrix corresponding to the transmitted vectors from users 1 and 2 (and the subscripts 1 and 2 refer to the corresponding user), n is a noise vector, and H is a channel matrix. The general MMSE solution is takes the form of the following:

$$\hat{x} = \bar{x} + VH^H(HVH^H + R_{(I+N)})^{-1}(y - H\bar{x}),$$

where $\bar{x}$, V represents the prior information, i.e., mean and variance of the symbol vector x:

$$V = \begin{bmatrix} v_1 & 0 \\ 0 & v_2 \end{bmatrix}, \bar{x} = \begin{bmatrix} \bar{x}_1 \\ \bar{x}_2 \end{bmatrix}$$

$$v_k = E[x_k x_k^*], \bar{x}_k = E[x_k].$$

Also, $\hat{x}$ is the value of x at the receiver, the superscript H indicates the matrix is Hermitian, $R_{(I+N)}$ is the interference and noise covariance matrix, the superscript of the asterisk indicates complex conjugate, the superscript "−1" indicates matrix inversion, and E[.] indicates the expectation.

There are a number of different possible non-linear receiver structures. For an LMMSE solution, without any prior information, the following may be performed:

$$\bar{x} = 0, V = I_2$$

$$\hat{x} = H^H(HH^H + R_{(I+N)})^{-1} y$$

$$\hat{x}_1 = e_1^T H^H(HH^H + R_{(I+N)})^{-1} y \propto h_1^H(h_2 h_2^H + R_{(I+N)})^{-1} y$$

where $e_j$ is the jth unit vector and the superscript T indicates transpose.

For a hard-interference cancellation (Hard-IC) receiver, with the first iteration using an LMMSE receiver, and user-1 is not decoded (i.e., CRC fail) but user-2 is decoded (i.e., CRC pass), then the user-1 is re-estimated using the following:

$$\hat{x}_1 = e_1^T VH^H(HVH^H + R_{(I+N)})^{-1}(y - H\bar{x})$$

$$\text{where, } V = \begin{bmatrix} 1 & 0 \\ 0 & 0 \end{bmatrix}, \bar{x} = \begin{bmatrix} 0 \\ x_2 \end{bmatrix}$$

This simplifies to the following:

$$\hat{x}_1 = h_1^H(h_1 h_1^H + R_{(I+N)})^{-1}(y - h_2 x_2) \propto h_1^H R_{(I+N)}^{-1}(y - h_2 x_2)$$

Figure 2:
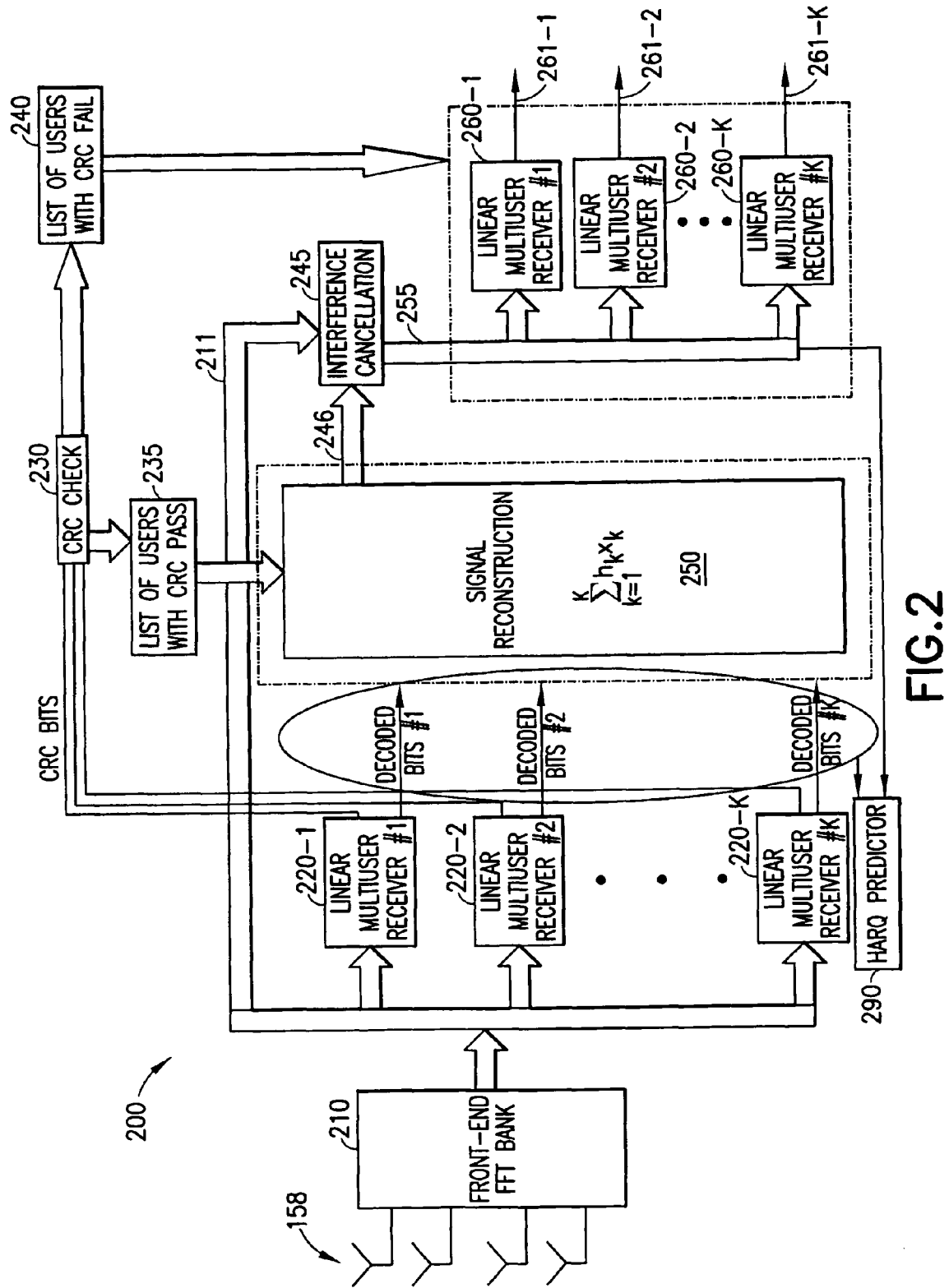
FIGS. 2 and 3 are block diagrams of exemplary interference canceling receivers and operations performed thereby.

A block diagram is shown in FIG. 2 of a Hard-IC (e.g., non-linear) receiver 200 and operations performed thereby. The receiver 200 forms part of the eNB 190-1, for instance, and can be implemented using, e.g., the one or more processors 150 (e.g., as DSPs or other integrated circuits), using the computer program code 153 as executed by the one or more processors 150 or using operations "hardwired" into the one or more processors 150, or some combination of these. In FIG. 2, the eNB 190-1 receives signals from the K UEs 110. In this example, the eNB 190-1 has four antennas 158, but this is merely exemplary and for ease of exposition. The receiver 200 includes a first stage and a second stage. The first stage can be considered to include, e.g., blocks 210 and 220. The second stage can be considered to include, e.g., blocks 230, 235, 240, 245, 250, and 260. The receiver 200 includes a front-end FFT bank 210, which outputs frequency domain signal 211 to the linear multiuser receivers 220-1 through 220-K and to the interference cancellation operation 245. Each of the linear multiuser receivers 220 produces a corresponding set of decoded bits and CRC bits.

The CRC bits are checked at the CRC check operation 230, which produces a list 235 of users with CRC pass and a list 240 of users with CRC fail.

The decoded bits are used by the signal reconstruction operation 250, which performs the signal reconstruction shown:

$$\sum_{k=1}^{K} h_k x_k.$$

The output of the signal reconstruction operation 250 is a reconstructed signal 246. The signal reconstruction operation 250 performs the following for each decoded user (i.e., each user with a CRC pass): constructs modulation symbols from the decoded bits; generates a frequency domain signal using the modulation symbols; and performs signal reconstruction by multiplying the frequency domain signal with an estimated channel for that user.

The interference cancellation operation 245 uses the reconstructed signal 246 to cancel interference from the frequency domain signal 211 and create an interference-reduced signal 255. The linear multiuser receivers 260-1 through 260-K operate on the signal 255 and use the list 240 of users with CRC fail, and produce corresponding output bit streams 261 for each of the users. In typical operation, only those receivers 260 having a corresponding user in the list 240 (of users with CRC fail) will perform decode operations.

The HARQ predictor 290 performs operations on information from the first stage (e.g., receivers 220) such as the decoded bits and/or the signal 255 of the interference cancellation operation 245. More specifically, the HARQ predictor 290 can apply one or more metrics to the information from the first stage to predict what the output of a HARQ signal will be after the receivers 260 have performed reception operations. The HARQ prediction can be based on one or more of the following non-limiting examples: (1) SINR estimate after interference cancellation (e.g., SINR on signal 255); (2) post-equalized SINR after interference cancellation (e.g., post-equalized SINR on signal 255); and/or (3) mutual information measured at the end of first stage of decoding (e.g., using the soft information of the decoded bits).

Another technique suitable for MU-MIMO or CoMP reception is soft-interference cancellation (Soft-IC). With the first iteration using a LMMSE receiver, the prior information is known for the next iteration. The symbol estimate with prior information is $\bar{x}$, V:

$$\hat{x} = \bar{x} + VH^H(HVH^H + R_{(I+N)})^{-1}(y - H\bar{x})$$

The symbol estimate is made independent from its own prior information. For example, for the first user one sets the following:

$$V = \begin{bmatrix} 1 & 0 \\ 0 & v_2 \end{bmatrix}, \bar{x} = \begin{bmatrix} 0 \\ \bar{x}_2 \end{bmatrix}.$$

Equivalently the estimate for the first user takes the following form:

$$x_1 = h_1^H(h_1 h_1^H + v_2 h_2 h_2^H + R_{(I+N)})^{-1}(y - h_2 \bar{x}_2)$$

$$\propto h_1^H(v_2 h_2 h_2^H + R_{(I+N)})^{-1}(y - h_2 \bar{x}_2)$$

Figure 3:
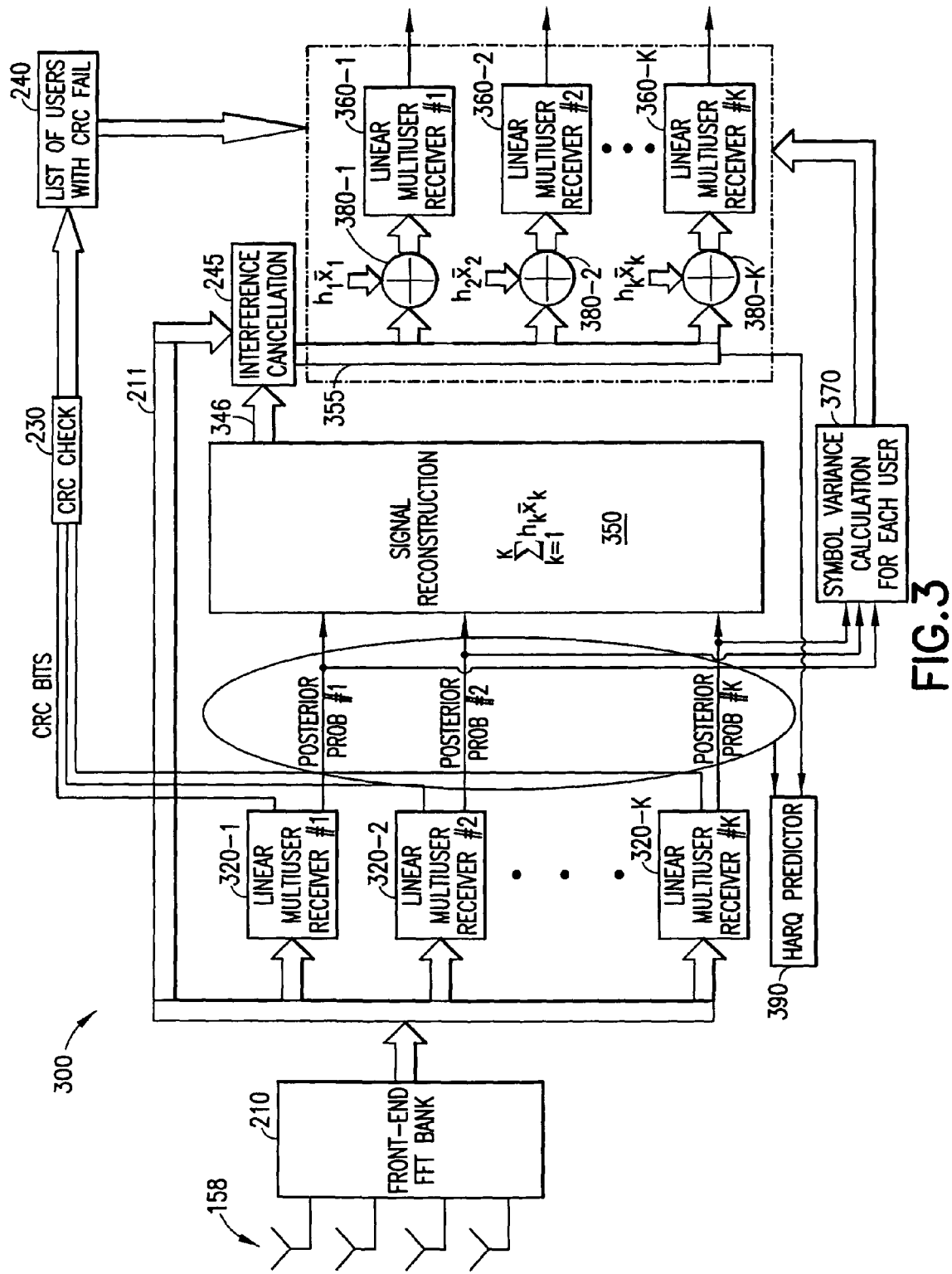

Turning now to FIG. 3, a block diagram is shown of an exemplary Soft-IC (e.g., non-linear) receiver 300. Many of the elements in the receive 300 are similar to the elements in receiver 200, therefore only the differences are discussed herein. Each linear multiuser receiver 320 produces a corresponding posterior probability and CRC bits. The signal reconstruction operation 350 uses the posterior probabilities to determine a reconstructed signal 346 using the following reconstruction operation:

$$\sum_{k=1}^{K} h_k \bar{x}_k.$$

The signal reconstruction block in 350 performs reconstruction for all the interferers (both decode-pass and decode-fail), whereas the signal reconstruction block in 250 performs reconstruction only of users with decode-pass.

The output 355 of the interference cancellation operation 245 is applied to a number of adders, of which three adders 380-1, 380-2, and 380-K are shown. These add the following corresponding signals to the output 355: $h_1 \bar{x}_1$, $h_2 \bar{x}_2$, and $h_K \bar{x}_K$, respectively. The outputs of the adders 380 are applied to the linear multiuser receivers 360. As with FIG. 2, in typical operation, only those receivers 360 having a corresponding user in the list 240 (of users with CRC fail) will perform decode operations. There is a symbol variance calculation 370 for each user that is applied to the receivers 360.

The HARQ predictor 390 performs operations on information from the first stage (e.g., receivers 320) such as the posterior probabilities and/or the output 355 of the interference cancellation operation 245. More specifically, the HARQ predictor 390 can apply one or more metrics to the information from the first stage to predict what the output of a HARQ signal will be after the receivers 360 have performed reception operations. The HARQ prediction can be based on one or more of the following non-limiting examples: (1) SINR estimate after interference cancellation, (2) post-equalized SINR after interference cancellation, and/or (3) mutual information measured at the end of first stage of decoding.

FIGS. 2 and 3 above can apply to both MU-MIMO and CoMP. In terms of MU-MIMO, the antennas 158 are on a single eNB. In CoMP, the basic difference is that all the antennas 158 shown need not come from one cell/sector and its corresponding single eNB. Also, the users from multiple cells/sectors can be jointly decoded in one big receiver that looks over all (or some large set of) the antennas that span multiple cells/sectors.

Figure 4C:
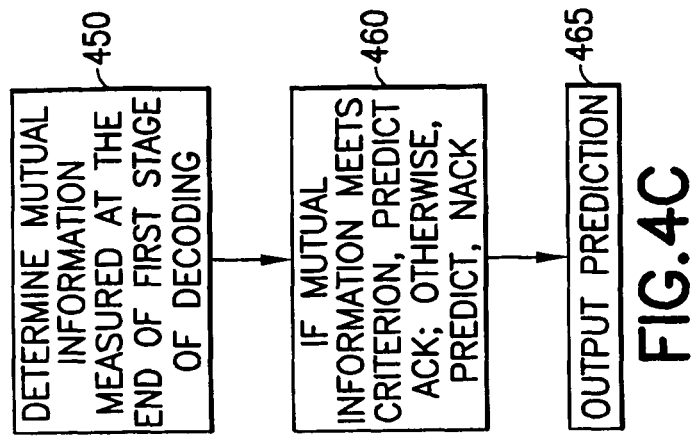
FIGS. 4A, 4B, and 4C, illustrates operations performed for exemplary HARQ predictors.
Figure 4B:
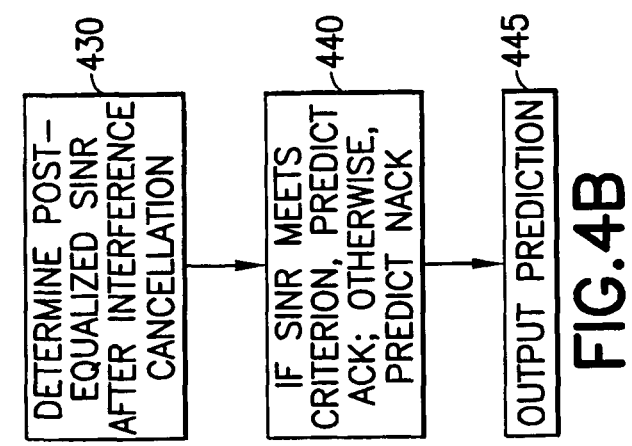
Figure 4A:
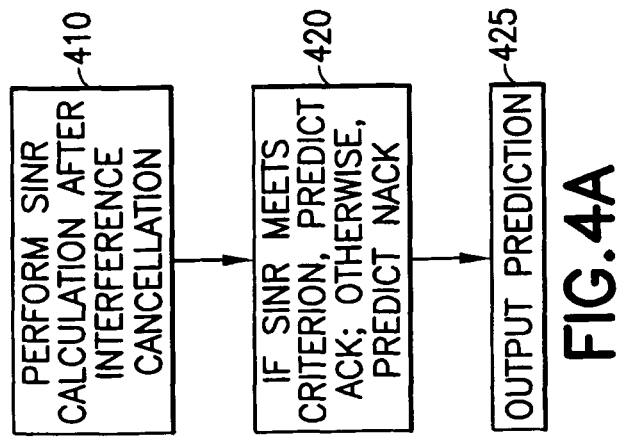

Turning now to FIG. 4, which includes FIGS. 4A, 4B, and 4C, this figure illustrates operations performed for exemplary HARQ predictors. In FIG. 4A, one example of the operations performed by HARQ predictor 290/390 is shown. In block 410, the HARQ predictor 290/390 performs an SINR calculation after interference cancellation (e.g., using signal 255/355). In block 420, if the determined SINR meets a criterion, the HARQ predictor 290/390 predicts an ACK. For instance, if the SINR is greater than a predetermined SINR, the SINR would meet the criterion. Otherwise, the HARQ predictor 290/390 predicts a NACK. It is noted that FIG. 11 has examples of performing an SINR calculation and predicting a HARQ ACK/NACK as illustrated in blocks 410, 420. In block 425, the HARQ predictor 290/390 outputs its prediction, e.g., via a hardware signal or a software signal.

FIG. 4B shows another example of the operations performed by an exemplary HARQ predictor 290/390. In block 430, the HARQ predictor 290/390 determines post-equalized SINR after the interference cancellation (e.g., using signal 255/355). In block 440, if the determined SINR meets a criterion, the HARQ predictor 290/390 predicts an ACK. For instance, if the SINR is greater than a predetermined SINR, the SINR would meet the criterion. Otherwise, the HARQ predictor 290/390 predicts a NACK. In block 445, the HARQ predictor 290/390 outputs its prediction, e.g., via a hardware signal or a software signal.

FIG. 4C shows another example of the operations performed by an exemplary HARQ predictor 290/390. In block 450, the HARQ predictor 290/390 determines mutual information measured at the end of first stage of decoding (e.g., using information corresponding to the decoded bits or the posterior probabilities). That is, a measure of mutual information is determined between the actual transmitted bits from the UE and decoded bits after the interference cancellation at the eNodeB receiver. The mutual information is a function mapping from the post-cancellation SINR to a quantity that relates to how many bits per symbol could be transmitted successfully if one had an interference canceling receiver. If this mutual information metric happens to be greater than (in an example) the product of the modulation order and the code rate of that particular transmission, one can determine that the packet decoding would succeed and send an ACK. Otherwise, one can deem that the packet decoding would have failed even post-cancellation and send a NACK. Thus, in block 460, if the mutual information meets a criterion, the HARQ predictor 290/390 predicts an ACK. Otherwise, the HARQ predictor 290/390 predicts a NACK. In block 465, the HARQ predictor 290/390 outputs its prediction, e.g., via a hardware signal or a software signal.

Figure 5:
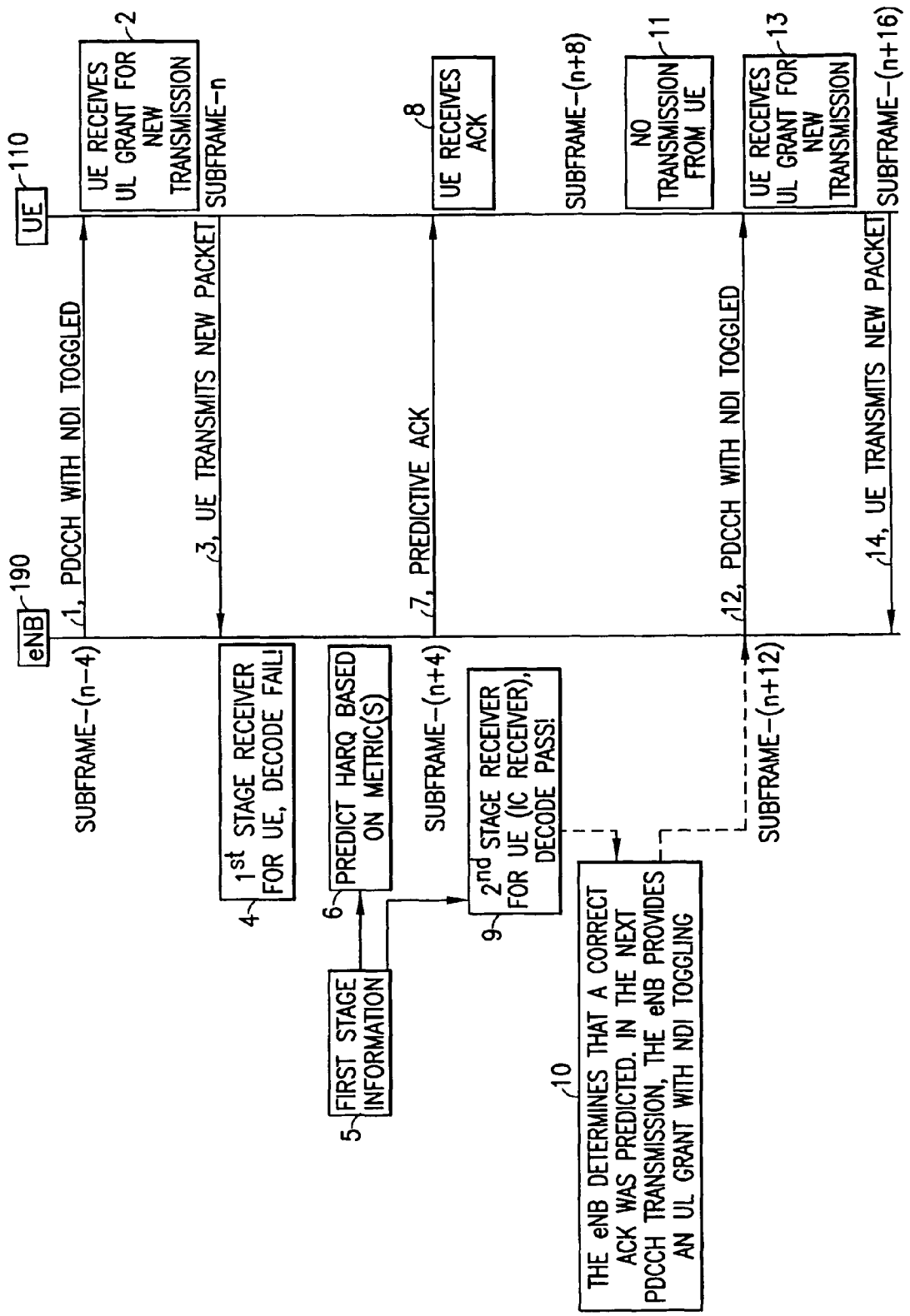
FIGS. 5 through 8 are signaling and method diagrams of operations performed between and by an eNB and a UE for HARQ prediction for non-linear receivers.
Figure 6:
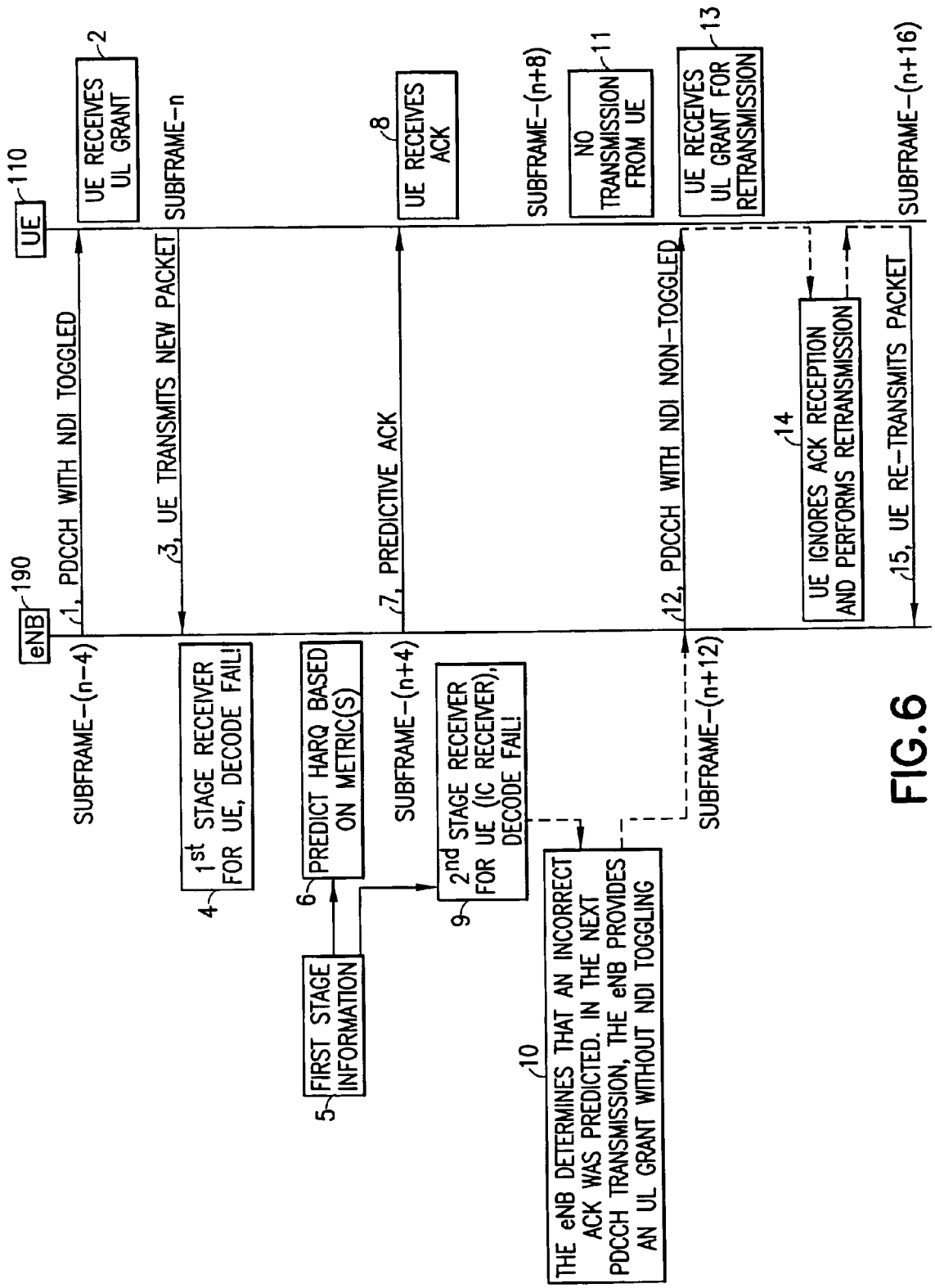
Figure 7:
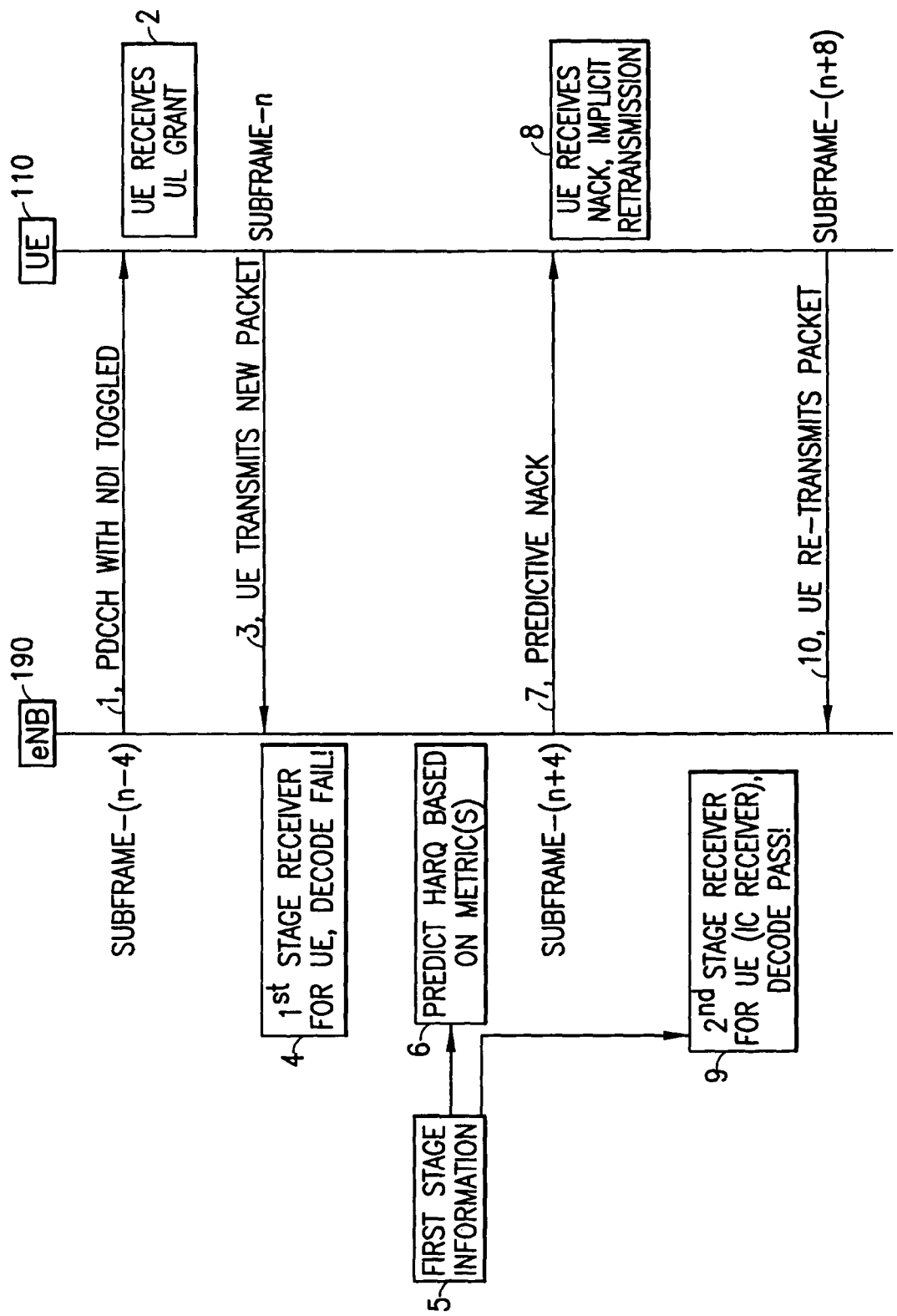
Figure 8:
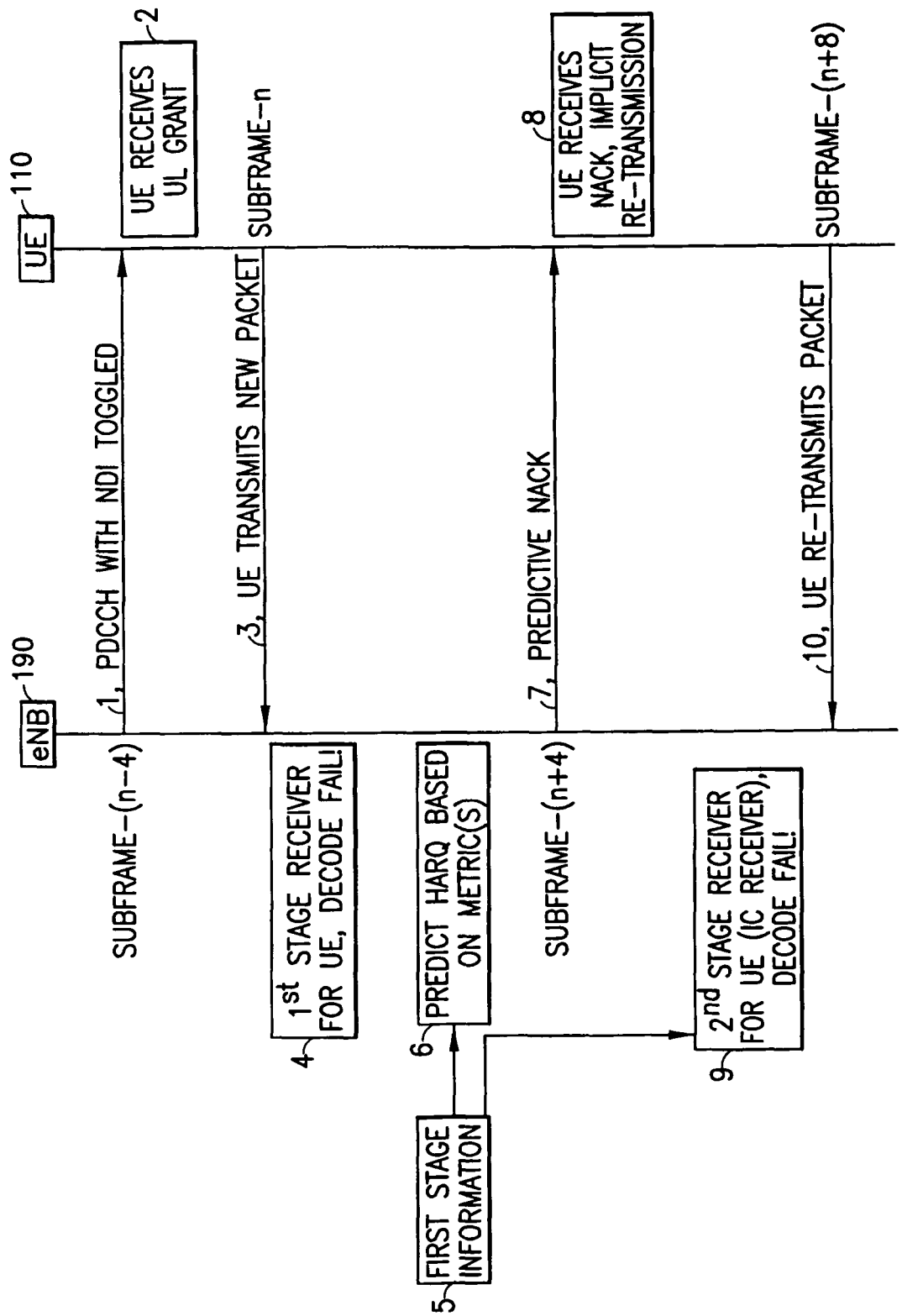

FIGS. 5-8 are directed to signaling between an eNB 190 and a single UE 110. FIG. 5 illustrates a case where the eNB 190 predicts an ACK correctly (i.e., the predicted ACK is the same as the actual ACK that is the output of the second stage receiver 260/360). FIG. 6 illustrates a case where the eNB 190 predicts an ACK incorrectly (i.e., an ACK is predicted, but the output of the second stage receiver 260/360 is an actual NACK). FIG. 7 illustrates a case where the eNB 190 predicts a NACK incorrectly (i.e., a NACK is predicted, but the output of the second stage receiver 260/360 is an actual ACK). FIG. 8 illustrates a case where the eNB 190 predicts a NACK correctly (i.e., the predicted NACK is the same as the actual NACK that is the output of the second stage receiver 260/360).

Referring now to FIG. 5, a signaling and method diagram is shown of operations performed between and by an eNB 190 and a UE 110 for HARQ prediction for non-linear receivers. In this example, the eNB 190 signals (operation 1) the UE 110 using PDCCH with NDI toggled. NDI is typically a single bit that indicates whether the resource being allocated is for a new transmission or for a re-transmission (for example, in response to a negative acknowledgement of the previous transmission). That is, a non-toggled NDI indicates a NACK to the previous transmission, whereas toggled NDI indicates a new transmission. A toggled NDI is taking the previously used value of the NDI and setting the value to a different value.

In operation 2, the UE 110 receives an UL grant for a new transmission. In operation 3, the UE transmits a new packet. It is noted this could include multiple packets but for simplicity only one packet is described. In operation 4, the first stage receiver 220/320 performs reception but has a decode failure for this UE. The status of the CRC shows if the packet is decode-pass or decode-fail. Error-correcting codes have cyclic redundancy check (CRC) data appended to the packet that helps the receiver determine if the decoded bits received were in fact correct or not. CRC is one type of error correcting (e.g., including detecting) codes, and other error correcting codes may be used. In operation 5, the first stage information is forwarded to operations 6 and 9. In operation 6, the eNB 190 predicts HARQ based on one or more metrics, as described above. In operation 7, the eNB 190 signals a predictive ACK (that is, the ACK predicted based on the metrics but before the true ACK/NACK output of the second stage receivers 260/360). In operation 8, the UE 110 receives the ACK.

In operation 9, the second stage receiver 260/360 performs reception and has a decode pass for this UE. In operation 10, the eNB 190 determines that a correct ACK was predicted. In the next PDCCH transmission (operation 12), the eNB 190 provides an UL grant with NDI toggling (i.e., indicating to the UE 110 that no retransmission is to be performed). In operation 13, the UE receives the UL grant for the new transmission and transmits a new packet in operation 14.

The operations in FIGS. 6-10 are similar to those performed in FIG. 5, and therefore only differences will mainly be described. Operations 1-8 are the same in FIG. 6 as in FIG. 5. However, in operation 9, the second stage receiver 260/360 performs decoding and has a decode fail for this UE. In operation 10, the eNB 190 determines that an incorrect ACK was predicted. In the next PDCCH transmission (operation 12), the eNB 190 provides an UP grant without NDI toggling (e.g., indicating to the UE that a retransmission should be performed). In operation 13, the UE receives an UL grant for retransmission. In operation 14, the UE 110 ignores the ACK reception (from operation 8) and performs (operation 15) a retransmission of the previous packet.

FIG. 7 is an example where the eNB 190 predicts an incorrect NACK resulting in inefficient usage of the uplink resource. That is, in operation 6, the eNB 190 predicts a NACK and signals the NACK in operation 7. However, the second stage receiver 260/360 performs reception and has a decode pass for this UE and therefore the predictive NACK signaled in operation 7 is incorrect. As described above, however, this occurs only about 10 percent of the time in simulations. In operation 8, the UE receives the (incorrect, predicted) NACK, which implies retransmission, and in operation 9, the UE re-transmits the packet.

In FIG. 8, a case is illustrated where the eNB 190 predicts a NACK correctly (i.e., the predicted NACK is the same as the NACK that is the output of the second stage receiver 260/360). That is, in operation 8, the eNB 190 predicts a NACK and signals the NACK in operation 7. The second stage receiver 260/360 performs reception and has a decode pass for this UE, and therefore the predictive NACK signaled in operation 7 is correct.

Figure 9:
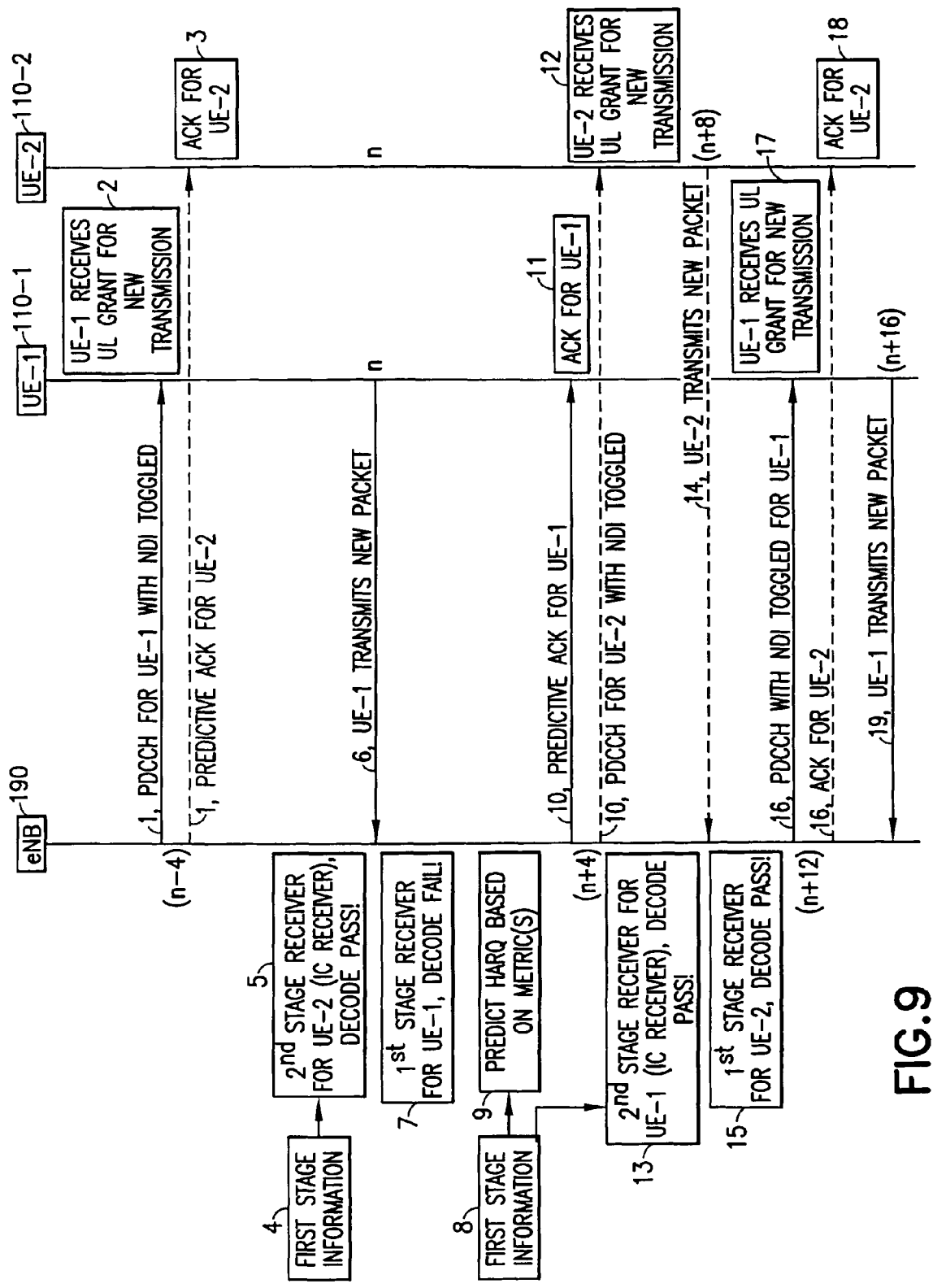
FIGS. 9 and 10 are signaling and method diagrams of operations performed between and by multiple eNBs and a UE for HARQ prediction for non-linear receivers.
Figure 10:
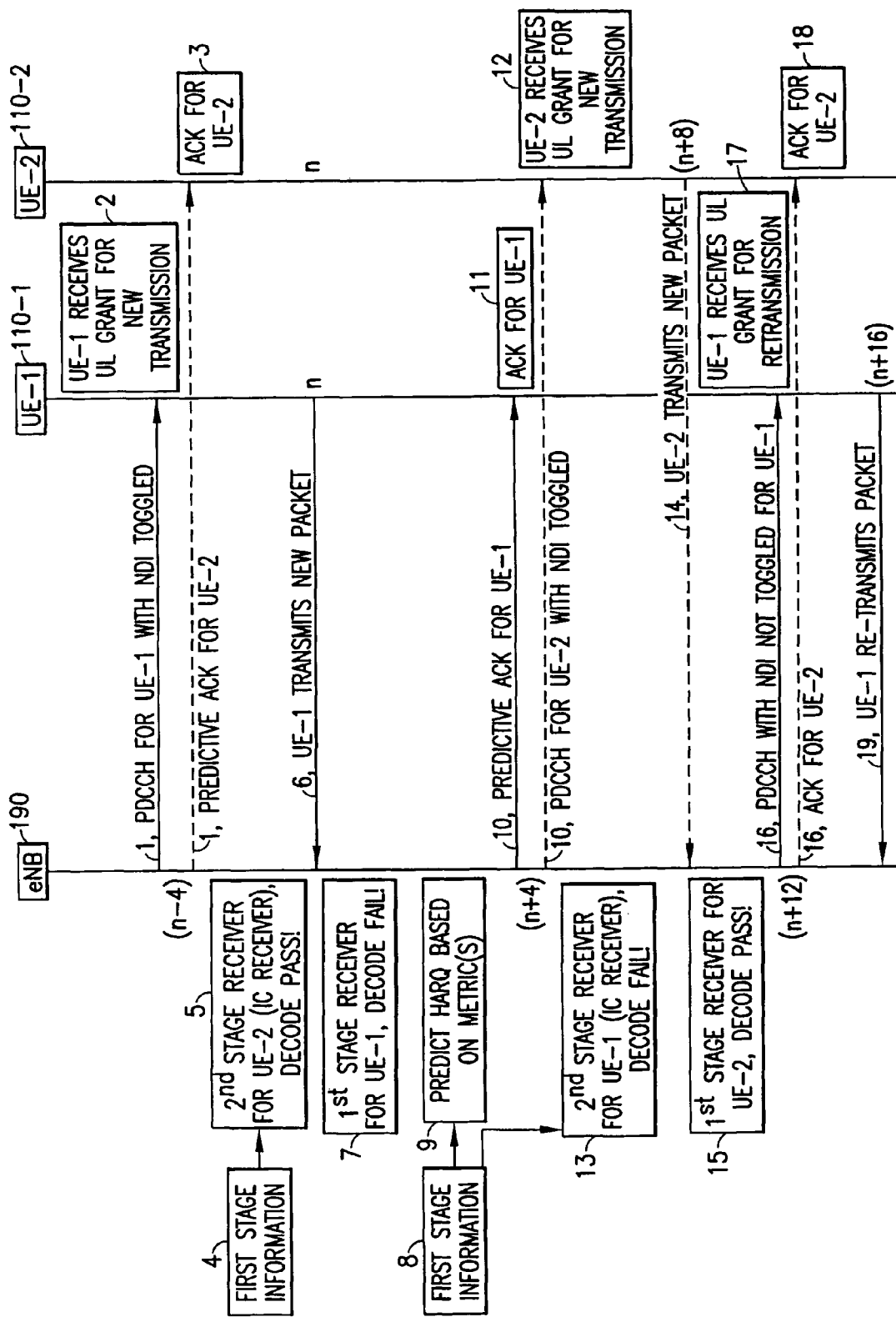

The techniques shown in reference to the single-user cases of FIGS. 5-8 can be applied to multi-users cases, too. FIGS. 9 and 10 show examples of these, and the figures are signaling and method diagrams of operations performed between and by multiple eNBs and a UE for HARQ prediction for non-linear receivers. FIG. 9 shows an example with a correct predictive ACK for UE-1 110-1, while FIG. 10 shows an example with an incorrect predictive ACK for UE-1.

In FIG. 9, the eNB 190 signals (operation 1) UE-1 110-1 using PDCCH with NDI toggled and signals (operation 1) a predictive ACK for UE-2 110-2. In operation 2, the UE-1 receives the UL grant for a new transmission. In operation 3, the UE-2 receives the ACK. In operation 4, the first stage information for UE-2 is communicated to the second stage receiver 260/360 for UE-2. In operation 5, the second stage receiver 260/360 performs decoding and determines the decoding passed.

In operation 6, the UE-1 transmits the new packet. In operation 7, the first stage receiver 220/320 performs decoding for UE-1 and determines a decode fails. Operation 8 forwards first stage information for UE-1 to operations 9 and 13. In operation 9, the eNB 190 predicts an ACK. In operation 10, the eNB 190 signals the predictive ACK for UE-1 to the UE-1 and communicates over PDCCH for UE-2 with NDI toggled. In operation 11, the UE-1 receives the ACK, and in operation 12, the UE-2 receives an UL grant for a new transmission In operation 13, the second stage receiver 260/360 completes decoding for UE-1 with a decode pass. In operation 14, the UE-2 transmits a new packet. In operation 15, the first stage receiver 220/320 for UE-2 performs reception with a decode pass. In operation 16, the eNB 190 signals PDCCH with NDI toggled for UE-1 and signals an ACK for UE-2. In bop 17, the UE-1 receives an UL grant for a new transmission, and in operation 18, the UE-2 receives an ACK. In operation 19, UE-1 transmits a new packet.

FIG. 10 shows an example with an incorrect predictive ACK for UE-1. Operations until operation 13 are the same as in FIG. 9. In operation 13, the second stage receiver 260/360 completes reception for UE-1 with a decode fail. In response to the decode fail, the eNB 190 signals (operation 16) using PDCCH with NDI not toggled for UE-1. In operation 17, the UE-1 receives an UL grant for retransmission and in operation 19, the UE-1 ignores the received ACK (operation 11) and retransmits the packet.

Figure 11:
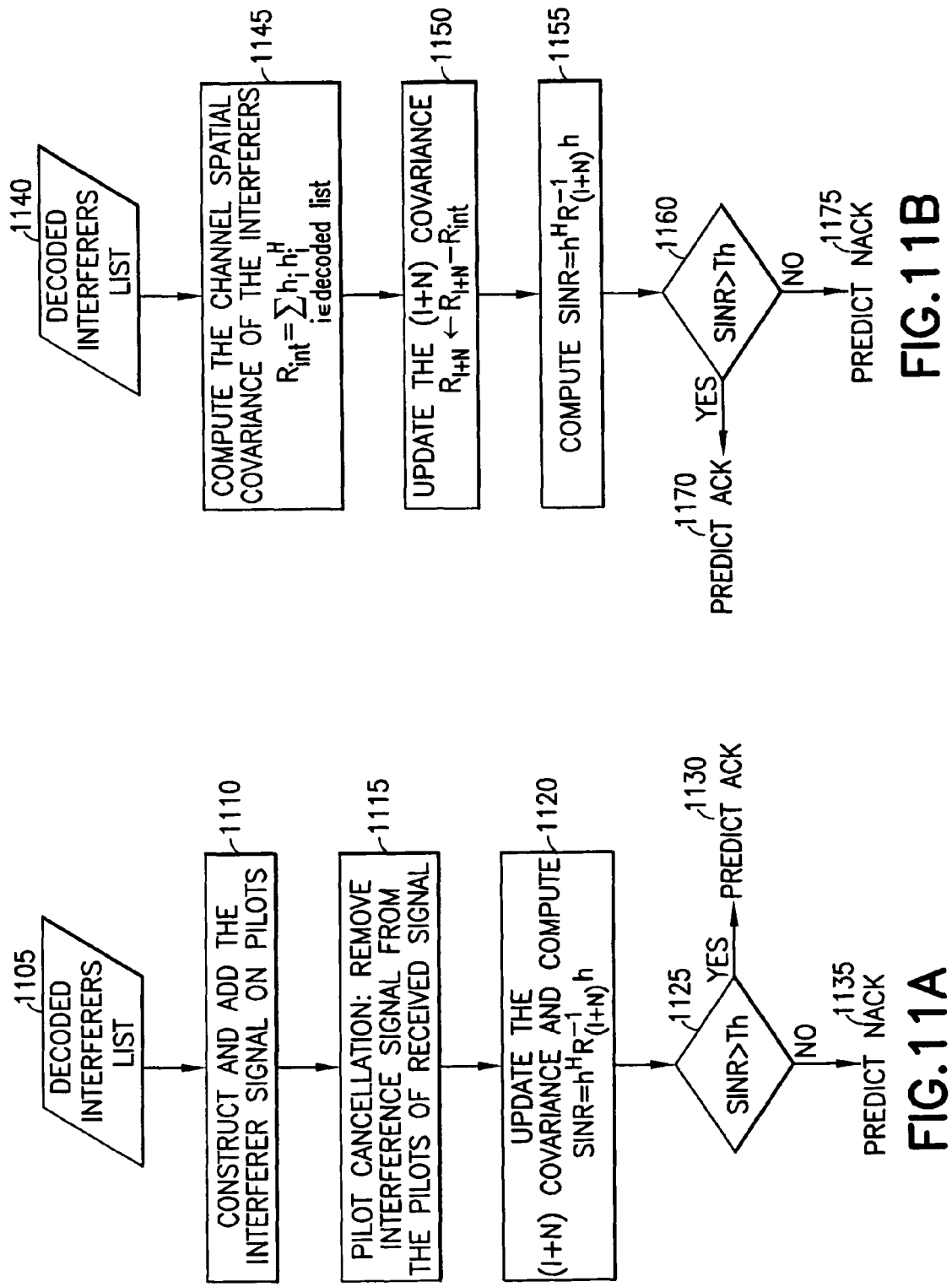
FIG. 11, including

FIG. 11, including FIGS. 11A and 11B, show examples of performing an SINR calculation and predicting a HARQ ACK/NACK. FIG. 11 concerns the post-equalized SINR after IC. One can also define SINR before antenna combining. The computation of $R_{(I+N)}$ in FIG. 11 is applicable to FIG. 3 when there are decode-pass users in the system of FIG. 3. In FIG. 11A, there is a decoded interferers list (e.g., the list 235 of FIG. 2, although the techniques of FIG. 11 are also applicable to FIG. 3) in block 1105.

In block 1110, the receiver 200/300 constructs and adds the interferer signal on the pilots in the signal. That is, all the interferer signals are constructed and added (e.g., based on the pilots) to form a total interference signal. In block 1115, the receiver performs pilot cancellation, e.g., by removing the interference signal from the pilots of the received signal. Pilot signals are used as these have known values. In block 1120, the receiver updates the interference plus noise (I+N) covariance and computes the SINR according to the following:

$$SINR = h^H R_{(I+N)}^{-1} h$$

In block 1125, it is determined if the SINR is greater than a threshold (Th). If so (block 1125=Yes), in the receiver 200/300 predicts an ACK in block 1130. If not (block 1125=No), in the receiver 200/300 predicts a NACK in block 1135.

In FIG. 11B, there is a decoded interferers list (e.g., the list 235 of FIG. 2, although the techniques of FIG. 11 are also applicable to FIG. 3) in block 1140. In block 1145, the receiver 200/300 computes the channel spatial covariance of the interferers accord to the following:

$$R_{int} = \sum_{i \in \substack{decoded \\ list}} h_i h_i^H.$$

In block 1150, the receiver updates the interference plus noise (I+N) covariance per the following:

$$R_{I+N} = R_{I+N} - R_{int}$$

In block 1155, the receiver computes the SINR via the following:

$$SINR = h^H R_{(I+N)} h.$$

In block 1160, if is determined if the SINR is greater than a threshold (Th). If so (block 1160=Yes), in the receiver 200/300 predicts an ACK in block 1170. If not (block 1160=No), in the receiver 200/300 predicts a NACK in block 1175.

Figure 12:
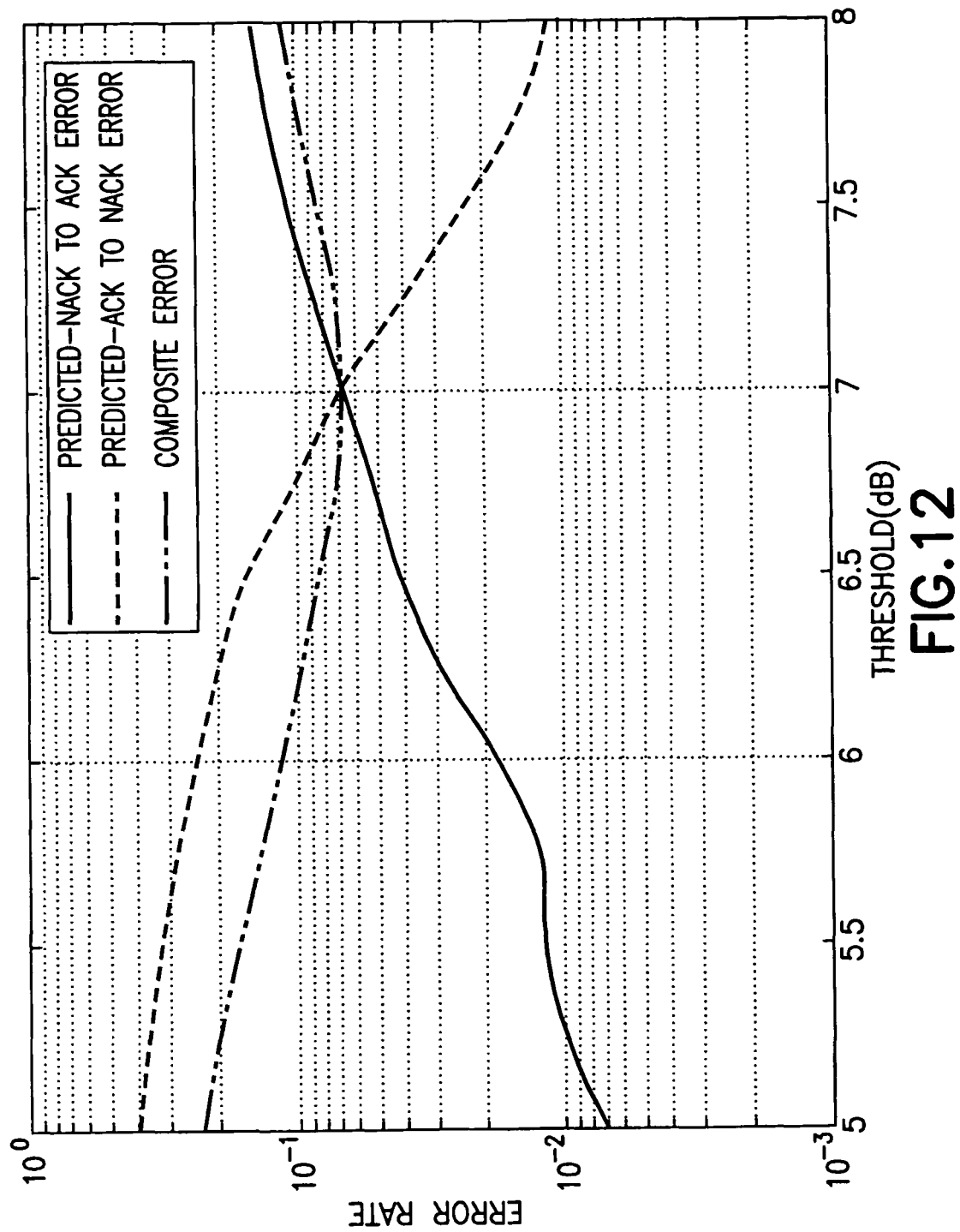
FIG. 12 shows an example of error performance of SINR based ACK/NACK prediction.

Turning to FIG. 12, this figure shows an example of error performance of SINR based ACK/NACK prediction. In this example, ACK/NACK prediction error is given as the composite error. The predicted-NACK to ACK error is due to NACK prediction but the second stage receiver succeeds (e.g., with an ACK). This results in wastage of UL resources for retransmission. The predicted-ACK to NACK error is due to ACK prediction but the second stage decode fails (e.g., with an NACK). This introduces delay in the system since this requires a grant for retransmissions. Based on the type of the traffic, one needs to put a penalty to the above errors to find an optimal threshold. In the plot provided, Th=7 dB holds well if the penalty is same for both the errors.

The following items are examples of possible implementations. 1. A method includes: in a receiver comprising first and second stages, each stage at least decoding information corresponding to a user equipment, wherein the second stage performs decoding only if the first stage completes decoding with a fail, predicting whether decoding performed by the second stage for the user equipment will complete with a pass or fail; and prior to completion of the second stage, sending an indication of the predicted pass or fail to the user equipment.

2. The method of item 1, wherein:
the first stage completes decoding for the user equipment with a fail;
predicting further comprises predicting the decoding performed by the second stage for the user equipment will complete with a pass; and
sending further comprises sending the indication of the predicted pass to the user equipment.

3. The method of item 1, wherein the user equipment is a selected user equipment, wherein each of the first and second stages at least decodes information for a plurality of user equipment, and wherein the second stage further comprises interference cancellation.

4. The method of item 3, wherein the interference cancellation uses a reconstructed signal from user equipment where the first stage completes decoding with a pass to determine an interference-reduced signal from a signal from all user equipment.

5. The method of item 3, wherein predicting further comprises predicting the second stage will complete with the pass in response to a signal to interference plus noise ratio calculation after interference cancellation meeting a criterion, and predicting the second stage will complete with the fail in response to the signal to interference plus noise ratio calculation after interference cancellation not meeting the criterion.

6. The method of item 3, wherein predicting further comprises predicting the second stage will complete with the pass in response to a post-equalization signal to interference plus noise ratio calculation after interference cancellation meeting a criterion, and predicting the second stage will complete with the fail in response to the post-equalization signal to interference plus noise ratio calculation after interference cancellation not meeting the criterion.

7. The method of any one of items 5 or 6, further comprising calculating the signal to interference plus noise ratio at least by, for user equipment where the first stage completes decoding with a pass:
constructing and adding interferer signals, for the user equipment where the first stage completes decoding with the pass, based on pilots to create a total interference signal;
performing pilot cancellation by removing the total interference signal from the pilots of the received signal to create a reduced interference signal;
updating an interference plus noise covariance based at least on the reduced interference signal; and
computing the signal to interference plus noise ratio based on the updated interference plus noise covariance.

8. The method of any one of items 5 or 6, further comprising calculating the signal to interference plus noise ratio at least by, for user equipment where the first stage completes decoding with a pass:
computing a channel spatial covariance of interferers reconstructed from decoded information from the user equipment where the first stage completes decoding with a pass;
updating an interference plus noise covariance based at least on the computed channel spatial covariance; and
computing the signal to interference plus noise ratio based on the updated interference plus noise covariance.

9. The method of item 3, wherein predicting further comprises predicting the second stage will complete with the pass in response to mutual information calculated using information from the first stag meeting a criterion, and predicting the second stage will complete with the fail in response to mutual information calculated using information from the first stag not meeting the criterion.

10. The method of item 1, further comprising, after completion of the second stage and determination by the second stage of an actual pass or actual fail, sending another indication of the actual pass or actual fail to the user equipment.

11. The method of item 10, wherein the indication of the actual pass is communicated to the user equipment via a control channel with a new data indicator toggled from a value of the new data indicator previously communicated to the user equipment.

12. The method of item 10, wherein the indication of the actual fail is communicated to the user equipment via a control channel with a new data indicator not toggled from a value of the new data indicator previously communicated to the user equipment.

13. The method of any one of the preceding items, wherein sending an indication of the predicted pass or fail to the user equipment further comprises sending an acknowledgement to the user equipment in response to a predicted pass and sending a negative acknowledgement to the user equipment in response to a predicted fail.

14. The method of any one of the preceding items, wherein the pass or fail is based on error correcting codes in the information.

15. An apparatus configured to perform the method as recited in any one of the preceding items.

16. A computer program product comprising program instructions to cause an apparatus to perform the method as recited in any one of the items 1 to 14.

A computer program product comprising a computer-readable medium bearing computer program code embodied therein for use with a computer, the computer program code comprising code for performing the method as recited in any one of the items 1 to 14.

An apparatus includes one or more processors and one or more memories including computer program code. The one or more memories and the computer program code are configured to, with the one or more processors, cause the apparatus to perform the method as recited in any one of the items 1 to 14.

An apparatus includes means for performing the method as recited in any one of the items 1 to 14.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIGS. 1 and 2. A computer-readable medium may comprise a computer-readable storage medium (e.g., memories 125, 155, and 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    in a receiver comprising first and second stages, each stage at least decoding information corresponding to a user equipment, wherein the second stage performs decoding only if the first stage completes decoding with a fail, predicting whether decoding performed by the second stage for the user equipment will complete either with a pass or with a fail;
    prior to completion of the second stage, sending an indication of the predicted pass or fail to the user equipment, wherein sending an indication of the predicted pass or fail to the user equipment further comprises:
        sending, should the predicting predict the pass, the indication of the predicted pass to the user equipment; and
        sending, should the predicting predict the fail, the indication of the predicted fail to the user equipment; and
    responsive to the second stage performing the decoding with a fail where the indication of the predicted pass was sent to the user equipment, sending an uplink grant with a new data indicator not toggled from a value of the new data indicator previously communicated to the user equipment.

2. The method of claim 1, wherein the user equipment is a selected user equipment, wherein each of the first and second stages at least decodes information for a plurality of user equipment, and wherein the second stage further comprises interference cancellation.

3. The method of claim 1, further comprising, after completion of the second stage and determination by the second stage of an actual pass or actual fail, sending another indication of the actual pass or actual fail to the user equipment.

4. The method of claim 1, where sending an uplink grant is communicated to the user equipment via a control channel.

5. The method of claim 1, wherein:
    the first stage completes decoding for the user equipment with a fail;
    predicting further comprises predicting the decoding performed by the second stage for the user equipment will complete with a pass; and
    sending further comprises sending the indication of the predicted pass to the user equipment.

6. The method of claim 1, wherein sending an indication of the predicted pass or fail to the user equipment further comprises sending an acknowledgement to the user equipment in response to a predicted pass and sending a negative acknowledgement to the user equipment in response to a predicted fail.

7. The method of claim 1, wherein the pass or fail is based on error correcting codes in the information.

8. The method of claim 2, wherein the interference cancellation uses a reconstructed signal from user equipment where the first stage completes decoding with a pass to determine an interference-reduced signal from a signal from all user equipment.

9. The method of claim 2, wherein predicting further comprises predicting the second stage will complete with the pass in response to a signal to interference plus noise ratio calculation after interference cancellation meeting a criterion, and predicting the second stage will complete with the fail in response to the signal to interference plus noise ratio calculation after interference cancellation not meeting the criterion.

10. The method of claim 2, wherein predicting further comprises predicting the second stage will complete with the pass in response to a post-equalization signal to interference plus noise ratio calculation after interference cancellation meeting a criterion, and predicting the second stage will complete with the fail in response to the post-equalization signal to interference plus noise ratio calculation after interference cancellation not meeting the criterion.

11. The method of claim 2, wherein predicting further comprises predicting the second stage will complete with the pass in response to mutual information calculated using information from the first stage meeting a criterion, and predicting the second stage will complete with the fail in response to mutual information calculated using information from the first stage not meeting the criterion.

12. The method of claim 3, wherein responsive to the second stage performing the decoding with a pass where the indication of the predicted pass was previously sent to the user equipment, the indication of the actual pass is communicated to the user equipment via a control channel with a new data indicator toggled from a value of the new data indicator previously communicated to the user equipment.

13. The method of claim 9, further comprising calculating the signal to interference plus noise ratio at least by, for user equipment where the first stage completes decoding with a pass:
  constructing and adding interferer signals, for the user equipment where the first stage completes decoding with the pass, based on pilots to create a total interference signal;
  performing pilot cancellation by removing the total interference signal from the pilots of the received signal to create a reduced interference signal;
  updating an interference plus noise covariance based at least on the reduced interference signal; and
  computing the signal to interference plus noise ratio based on the updated interference plus noise covariance.

14. The method of claim 9, further comprising calculating the signal to interference plus noise ratio at least by, for user equipment where the first stage completes decoding with a pass:
  computing a channel spatial covariance of interferers reconstructed from decoded information from the user equipment where the first stage completes decoding with a pass;
  updating an interference plus noise covariance based at least on the computed channel spatial covariance; and
  computing the signal to interference plus noise ratio based on the updated interference plus noise covariance.

15. A computer program product comprising a non-transitory computer-readable medium bearing computer program code embodied therein for use with a computer, the computer program code comprising:
  code for, in a receiver comprising first and second stages, each stage at least decoding information corresponding to a user equipment, wherein the second stage performs decoding only if the first stage completes decoding with a fail, predicting whether decoding performed by the second stage for the user equipment will complete either with a pass or with a fail;
  code for, prior to completion of the second stage, sending an indication of the predicted pass or fail to the user equipment, wherein the code for sending an indication of the predicted pass or fail to the user equipment further comprises:
    code for sending, should the predicting predict the pass, the indication of the predicted pass to the user equipment; and
    code for sending, should the predicting predict the fail, the indication of the predicted fail to the user equipment; and
  code for, responsive to the second stage performing the decoding with a fail where the indication of the predicted pass was sent to the user equipment, sending an uplink grant with a new data indicator not toggled from a value of the new data indicator previously communicated to the user equipment.

16. An apparatus, comprising:
  a receiver comprising first and second stages, each stage at least decoding information corresponding to a user equipment, wherein the second stage performs decoding only if the first stage completes decoding with a fail;
  one or more processors; and
  one or more memories including computer program code, the one or more memories and the computer program code are configured, with the one or more processors, to cause the apparatus to perform at least the following:
    predicting whether decoding performed by the second stage for the user equipment will complete either with a pass or with a fail;
    prior to completion of the second stage, sending an indication of the predicted pass or fail to the user equipment, wherein sending an indication of the predicted pass or fail to the user equipment further comprises:
      sending, should the predicting predict the pass, the indication of the predicted pass to the user equipment; and
      sending, should the predicting predict the fail, the indication of the predicted fail to the user equipment; and
    responsive to the second stage performing the decoding with a fail where the indication of the predicted pass was sent to the user equipment, sending an uplink grant with a new data indicator not toggled from a value of the new data indicator previously communicated to the user equipment.

17. The apparatus of claim 16, wherein the user equipment is a selected user equipment, wherein each of the first and second stages at least decodes information for a plurality of user equipment, and wherein the second stage further comprises interference cancellation.

18. The apparatus of claim 16, wherein predicting further comprises predicting the second stage will complete with the pass in response to mutual information calculated using information from the first stage meeting a criterion, and predicting the second stage will complete with the fail in response to mutual information calculated using information from the first stage not meeting the criterion.

19. The apparatus of claim 16, wherein the one or more memories and the computer program code are further configured, with the one or more processors, to cause the apparatus to perform at least the following: after completion of the second stage and determination by the second stage of an actual pass or actual fail, sending another indication of the actual pass or actual fail to the user equipment.

20. The apparatus of claim 16, wherein:
  the first stage completes decoding for the user equipment with a fail;

predicting further comprises predicting the decoding performed by the second stage for the user equipment will complete with a pass; and sending further comprises sending the indication of the predicted pass to the user equipment.

\* \* \* \* \*